United States Patent
Bai et al.

(10) Patent No.: US 7,302,097 B2
(45) Date of Patent: Nov. 27, 2007

(54) MRC IMAGE COMPRESSION

(75) Inventors: Yingjun Bai, Webster, NY (US); Ramesh Nagarajan, Pittsford, NY (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 694 days.

(21) Appl. No.: 10/941,411

(22) Filed: Sep. 15, 2004

(65) Prior Publication Data
US 2006/0056710 A1   Mar. 16, 2006

(51) Int. Cl.
G06K 9/00   (2006.01)

(52) U.S. Cl. .................... 382/173; 382/176

(58) Field of Classification Search ............... 382/173, 382/176
See application file for complete search history.

(56) References Cited

U.S. PATENT DOCUMENTS

| | | | |
|---|---|---|---|
| 5,854,857 A | 12/1998 | de Queiroz et al. | 382/232 |
| 5,956,468 A * | 9/1999 | Ancin | 358/1.9 |
| 6,593,935 B2 * | 7/2003 | Imaizumi et al. | 345/619 |
| 2002/0076103 A1 | 6/2002 | Lin et al. | 382/173 |
| 2003/0072487 A1 | 4/2003 | Fan et al. | 382/176 |

* cited by examiner

Primary Examiner—Phuoc Tran
(74) Attorney, Agent, or Firm—R. Hutter

(57) ABSTRACT

A method of processing an MRC image file, comprising at least a mask plane and a background plane, comprises determining that at least one of the mask plane and background plane is substantially empty; and effectively removing the substantially empty plane from the file for further processing.

13 Claims, 2 Drawing Sheets

MRC IMAGE COMPRESSION

TECHNICAL FIELD

The present disclosure relates to image processing, and specifically to a "mixed raster content" (MRC) technique for organizing and compressing image data, as would be useful in, for example, digital scanners, cameras or printers.

BACKGROUND

The "mixed raster content" (MRC) representation of documents provides the ability to represent color images and either color or monochrome text. In an MRC representation, an image is represented by more than one image plane. The main advantage of the MRC representation of documents is to provide an efficient way to store, transmit, and manipulate large digital color documents. The method exploits the properties of the human vision system, where the ability to distinguish small color variations is greatly reduced in the presence of high-contrast edges. The edge information is normally separated from the smoothly varying color information, and encoded in one of the planes, called the mask plane. Following a careful separation, the various planes can be independently compressed using standard compression schemes (such as JPEG and G4) with good compression and high quality at the same time.

The general MRC representation typically comprises three independent planes: foreground, background, and a mask plane. The background plane is typically used for storing continuous-tone information such as smoothly varying background colors. The mask plane normally holds the image of text (binary) as well as other edge information (e.g., line art drawings). The foreground plane usually holds the color of the corresponding text and/or line art. However, the MRC representation specifies only the planes and their associated compression methods: it does not otherwise restrict nor enforce the content of each of the planes. The content of each of the planes may be defined appropriately by an implementation of the MRC representation.

The foreground and background planes are defined to be two full-color (L, a, b) or YCC planes. The mask plane is defined as a binary (1-bit deep) plane. One exemplary MRC representation specifies that the foreground and background are to be JPEG compressed, or more generally, can be a suitable image for a lossy compression technique, and that the mask plane is to be ITU-G4 compressed, or more broadly is suitable for a lossless compression technique. In general, the foreground, background, and mask planes can all have different spatial resolutions, and they are not required to maintain the original source input resolution.

In a practical implementation of scanning image data and rendering it in MRC, there are two basic challenges that impede the efficiency of processing of the image data. One, in a large scanning job there is often a mix of single-side imaged and two-side imaged sheets: it is most efficient to simply scan both sides of every sheet, but this will leave the unused sides of single-sided sheets to be recorded and stored as meaningless data. Two, black-text-only images submitted to MRC representation result in a mask plane and a background plane, but the background plane represents redundant data; however, it is impractical to pre-separate text-only originals from the rest of a set of images. Photograph-only images yield the opposite situation: in such a case the mask plane would be redundant.

Another challenge to efficient MRC compression is presented by document images that include "highlights", "watermarks", or similar areas of light (near-white in luminance) and uniform coloration. Such areas occur in an image when, for example, digital or physical watermarks or graphics are present in the original image, or if the original image comprises text printed on lightly-colored paper. These images present opportunities to realize efficiencies in compression.

In some cases, the MRC processing can be designed to provide only background and mask planes without a foreground plane. The mask plane could represent black text while the background representing the smooth transitioned (such as photograph) area. This type of MRC representation is often called two-layer MRC representation. The MRC representation can also comprise one background layer and multiple mask layers: the type of representation is generally called multiple layer MRC or multiple mask MRC. For illustration purposes, the embodiment is explained using two-layer MRC representation, although embodiments based on three or more layers are possible.

U.S. Pat. No. 5,854,857 discloses an enhancement to the standard JPEG compression technique, including a step of recording the length of each string of bits corresponding to each block of pixels in the original image at the time of compression. The list of lengths of each string of bits in the compressed image data is retained as an "encoding cost map" or ECM. The ECM, which is considerably smaller than the compressed image data, can be transmitted or retained in memory separate from the compressed image data along with some other accompanying information and used as a "key" for editing or segmentation of the compressed image data.

U.S. Patent Application Publication 2002/0076103 A1 gives a general overview of an MRC-based compression technique.

U.S. Patent Application Publication 2003/0072487 A1 discloses an image segmentation technique which identifies a main background and one or more objects in an image being processed. Objects that cannot be classified as text or pictures are further segmented into a local background and smaller objects.

SUMMARY

According to one aspect, there is provided a method of processing an image file comprising at least a mask plane and a background plane. At least one of the mask plane and background plane is determined to be substantially empty. The substantially empty one of the mask plane and background plane is effectively removed from the file for further processing.

DETAILED DESCRIPTION

The overall intention of the method shown in the Figures is to identify certain types of image data which are particularly suitable for certain types of compression techniques and avoid carrying unnecessary information in the compression image file. The input to the illustrated method is a file of data corresponding to an image, as would be collected, for instance, when a hard-copy image is scanned by a photosensitive apparatus such as an input scanner.

Figure 1:
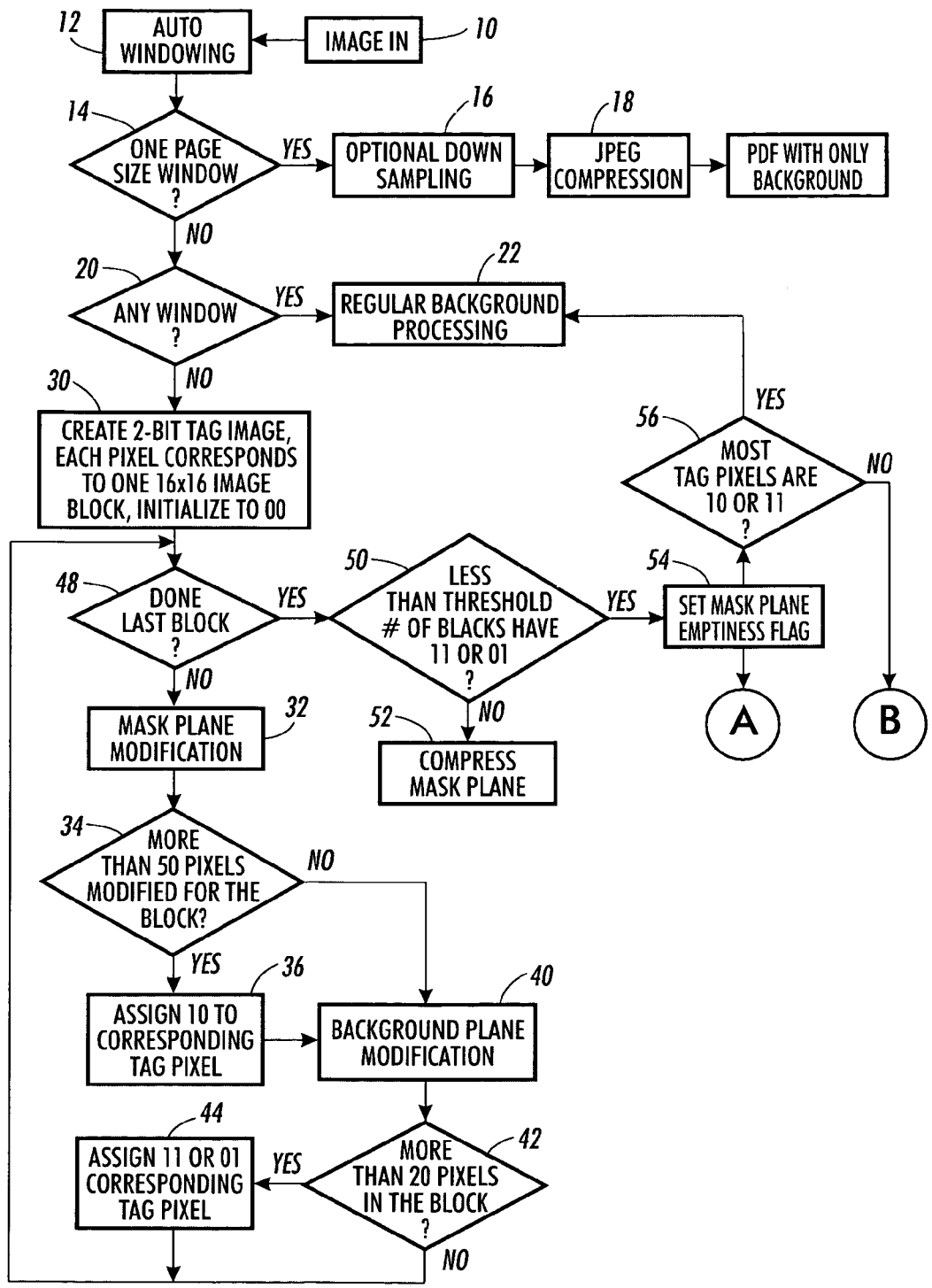
FIGS. 1 and 2 are simplified flow-charts respectively showing stages of an image-processing method.

Turning to FIG. 1, when data corresponding to an image is received (step 10) it is first subjected to an auto-windowing operation (step 12), of any of a number of types known in the art. The auto-windowing operation can segment the image into discrete sections, such as text and photograph, if possible. If the auto-windowing operation results in a single page-size window (step 14), the single window can optionally be "down-sampled" (i.e., only a subsampling of regularly-spaced data from the image is considered) and compressed such as according to JPEG compression (step 16). This yields a PDF comprising only a background plane (step 18), which means the PDF comprises only a JPEG compressed image: the mask plane and foreground of the MRC representation of the image is not needed. If there exist, based on the auto-windowing operation, any windows, or recognizable segments in the image (step 20) the segmented image is deemed a "regular image" (step 22), to be handled in a manner as will be described below.

If there are determined to be no windows in the image, the image data is then analyzed to identify what can be called "highlight" portions of the image, meaning areas of the image having light areas, such as could (but not necessarily) be caused by the presence of a digital or physical watermark in the original image, and check if the page is actually blank, meaning the mask plane of the segmented image is empty. The first step to accomplish the above mentioned these tasks, in this embodiment, is to create a "tag" image, meaning a smaller image in which each pixel datum corresponds to a 16×16 pixel block in the original image. In the tag image, each pixel datum comprises two bits, and thus there can be defined four types of images for each datum in the tag image at one time, and these types can be labeled 00, 01, 10, and 11, as will be explained below.

The original image data is used to create the tag image first by considering the image one 16×16 block at a time (step 30). Each block is initialized to have a value of 00, standing for a blank block, in the tag image. Each 16×16 block in the original image data is examined to determine the emptiness of the mask plane and check if the block has only highlight content. The examination is conducted in two post processing operations after the auto windowing operation described above, along with one additional highlight checking operation. The created tag image will be modified during the operation of the two post-processing steps.

In a two-layer MRC model, the mask plane retains data for black text only. In the first step of the two-step post processing operation (step 32), the small region(s) that may be segmented as text during the auto windowing operation are examined further pixel by pixel: this operation cleans up the mask plane. During the mask plane modification, if less than certain threshold number of pixels, for instance 50, out of the 256 pixels for the block are removed from the mask plane and assigned to the background plane (step 34), then the block has non-highlight background content. The block will be assigned 10 in the tag image (step 36).

In the second step of the two-step post processing operation (step 40), all the pixels in the background plane that correspond to black text are replaced by the values of surrounding pixels that are not classified as text; this operation can be called "background plane modification". This operation removes the black text from the background image and creates a smooth transitioned background plane. After these operations, the mask plane can be compressed using lossless binary compression method and the background can be compressed using a lossy contone compression method. If the number of text pixels in the block is more than certain threshold, such as 20 out of 256 pixels in the block, (step 42) then the block is assigned 11 if it is already 10, or 01 if it is still 00 (step 44).

Once the entire original image is processed block by block (ending at step 48), the accumulated tag image can then be analyzed as a whole to determine the content of the page. The analysis of a tag image can be considered one way of determining the "extent" of a type of pixel within the image, the "extent" in various possible embodiments including considering the number of pixels of a type, and/or the spatial distribution of pixels of a type within the image. If, in the tag image, there are more blocks that have either 11 or 01 value than a threshold block number (step 50), then the mask plane is not empty. The mask plane is then compressed and handled as regular case (step 46). Otherwise, the mask plane is empty, and the mask plane emptiness flag is set (step 54). No mask plane compression will happen, the mask plane is removed, and the resultant MRC file will have only a background plane. If a threshold number of blocks in the tag image have been assigned either 10 or 11 (step 56), then the background plane contains more than highlight area if any. The background plane is then compressed using a nominal compression scheme, which is down-sampled into half resolution and compressed using less aggressive quantization (step 22). Otherwise the highlight detection operation will be activated to process the background further.

Figure 2:
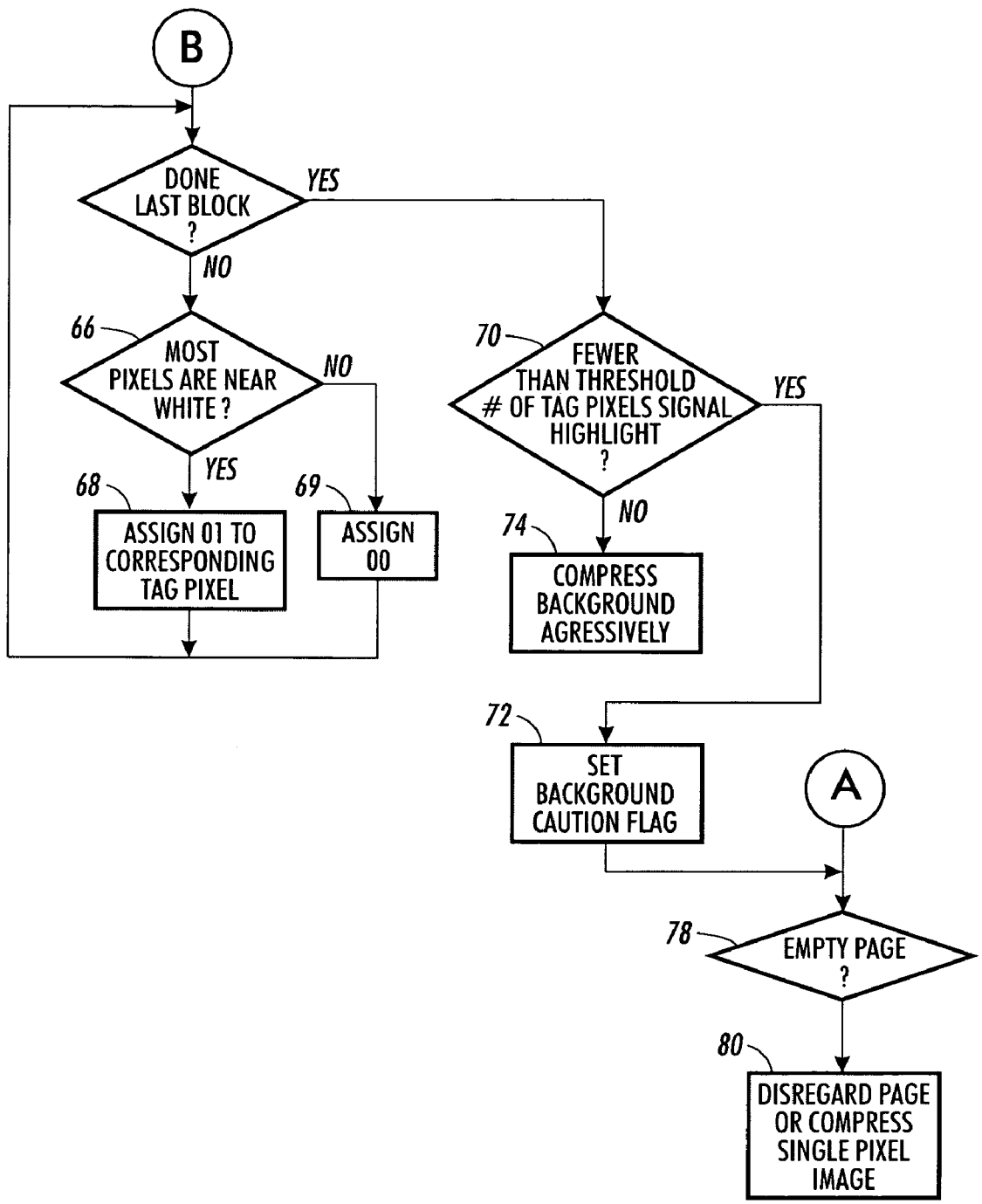

If substantially all the blocks of the tag image have only a 00 or 01 value, then further highlight checking is needed, as can be seen in the continuation of the method shown in FIG. 2. The highlight checking is done by determining if a threshold number of pixels inside each block have near white pixel value, for instance, between 250 and 255 (step 66). If this is the case, then the block will be assigned as 01 (step 68); otherwise, it will be reset to be 00 (step 69). After highlight examination, if fewer than a threshold number of blocks, such as 20, have been detected that have highlight content (with tag pixel value of 01) (step 70), then the whole background is judged to be blank, and the background emptiness flag is set (step 72). Otherwise, the background contains highlight areas, which may be aggressively subsampled, or otherwise aggressively compressed, to improve the file size (step 74).

If both mask plane emptiness flag and background plane emptiness flag is set (step 78), then the page is empty, it can be disregarded or compressed as single pixel image (step 80).

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method of processing an image file comprising at least a mask plane and a background plane, comprising:
    determining that at least one of the mask plane and background plane is substantially empty; and
    effectively removing the substantially empty one of the mask plane and background plane from the file for further processing.

2. The method of claim 1, further comprising
    determining that both the mask plane and background plane are substantially empty; and
    effectively considering the image file as a single pixel image for further processing.

3. The method of claim 1, further comprising
determining an extent of highlight pixels in the image.

4. The method of claim 3, further comprising
as a result of determining an extent of highlight pixels in the image, determining that the background plane is empty.

5. The method of claim 3, the determining an extent of highlight pixels in the image including
considering the image file as a set of blocks in an image,
for each block in the image, determining that the block has a predetermined number of background pixels.

6. The method of claim 1, the determining including
modifying the mask plane, the modifying including assigning a subset of pixels in the mask plane to the background plane, and
determining an extent of the subset of pixels assigned from the mask plane to the background plane,
deciding to remove the background plane at least in part as a result of the subset of pixels having a greater extent than the predetermined threshold.

7. The method of claim 6, the modifying the mask plane including
determining that a pixel in the mask plane is not associated with text.

8. The method of claim 6, the determining an extent of the subset of pixels assigned from the mask plane to the background plane including
considering the image file as a set of blocks in an image,
for each block in the image, determining that the block has non-highlight background content.

9. The method of claim 6, the determining an extent of the subset of pixels assigned from the mask plane to the background plane including
considering the image file as a set of blocks in an image,
for each block in the image, determining that more than a threshold number of pixels are assigned from the mask plane to the background plane in the modifying step, and
determining that more than a threshold number of blocks in the image have more than the threshold number of pixels assigned from the mask plane to the background plane.

10. The method of claim 1, the determining including
modifying the background plane, the modifying including removing pixels associated with text from the background plane,
determining an extent of the pixels associated with text in the background plane, and
deciding to remove the background plane at least in part as a result of the subset of pixels having a greater extent than a predetermined threshold.

11. The method of claim 10, modifying the background plane including
replacing a pixel in the background plane that corresponds to black text with a value of at least one pixel that is not classified as text.

12. The method of claim 10, the determining an extent of the pixels associated with black text in the background plane including
considering the image file as a set of blocks in an image,
for each block in the image, determining that there are more than a threshold number of pixels associated with text in the background plane, and
determining that more than a threshold number of blocks in the image have more than the threshold number of pixels associated with text in the background plane.

13. The method of claim 1, further comprising
determining an extent of near-white pixels in the background plane; and
at least partially as result of determining the extent of near-white pixels in the background plane, effectively removing the background plane from the file for further processing.

* * * * *